United States Patent [19]

Garside

[11] Patent Number: 4,772,189
[45] Date of Patent: Sep. 20, 1988

[54] ROTOR FOR A ROTARY ENGINE

[75] Inventor: David W. Garside, Solihull, United Kingdom

[73] Assignee: Norton Motors Limited, Lichfield, United Kingdom

[21] Appl. No.: 932,458

[22] Filed: Nov. 18, 1986

[30] Foreign Application Priority Data

Nov. 20, 1985 [GB] United Kingdom ............... 8528575

[51] Int. Cl.$^4$ .................. F01C 1/22; F01C 21/06
[52] U.S. Cl. ................ 418/61.2; 29/156.4 R; 29/DIG. 48; 29/525.1; 418/91
[58] Field of Search ............ 418/61 A, 91, 186, 60, 418/270; 29/156.4 R, 156.4 WL, DIG. 48, 526 R

[56] References Cited

U.S. PATENT DOCUMENTS

| | | | |
|---|---|---|---|
| 3,465,729 | 9/1969 | Jones | 418/61 A |
| 3,801,240 | 4/1974 | Ruf | 418/61 A |
| 3,802,810 | 4/1974 | Reitz et al. | 418/61 A |
| 3,942,918 | 3/1976 | Hermes | 418/61 A |
| 4,486,159 | 12/1984 | Garside | 418/61 A |

FOREIGN PATENT DOCUMENTS

| | | |
|---|---|---|
| 2061927 | 6/1972 | Fed. Rep. of Germany . |
| 967465 | 8/1964 | United Kingdom . |
| 999489 | 7/1965 | United Kingdom . |
| 2100795 | 1/1983 | United Kingdom . |

OTHER PUBLICATIONS

Technische Rundschau, 15 Feb. 1952.

Primary Examiner—Leonard E. Smith
Assistant Examiner—Leonard P. Walnoha
Attorney, Agent, or Firm—Pearne, Gordon, McCoy & Granger

[57] ABSTRACT

An air cooled rotor for a rotary internal combustion engine, such as a Wankel type engine, in which the housing has a two-lobed epitrochoidal bore which forms the cavity, the rotor having an outer profile of generally equilateral triangular shape with outwardly curved sides, such as convexly curved sides, and the rotor being mounted on an eccentric journal of a main shaft and being geared to rotate in a planetary manner within the cavity at one third of the speed of rotation of the main shaft, the rotor comprising a body and an insert secured together by one or more rigid fasteners which extend into a passage part of the insert from a passage part of the body which opens to the outer profile of the rotor, the or each fastener extending transverse to the axis of rotation of the rotor, at an angle of between 70° and 90° to the axis.

12 Claims, 2 Drawing Sheets

ROTOR FOR A ROTARY ENGINE

BACKGROUND TO THE INVENTION

This invention relates to a rotor for a rotary internal combustion engine of the kind, hereinafter referred to as being of the kind specified, in which a rotary piston or rotor, rotates within a cavity in a housing, the rotor and the walls of the cavity being so shaped that working chambers are formed therebetween which vary in volume as the rotor rotates, and the cavity being provided with inlet and exhaust parts.

More particularly, but not exclusively, the invention relates to a rotor for a so-called Wankel engine in which the housing has a two-lobed epitrochoidal bore which forms the cavity and has end plates which form axially spaced end walls closing the cavity, the rotor having an outer profile of generally equilateral triangular shape with outwardly curved sides such as convexly curved sides, and the rotor being mounted on an eccentric journal of a main shaft and being geared to rotate in a planetary manner within the cavity at one third of the speed of rotation of the main shaft.

A rotor for a Wankel type engine is described and claimed in our previous patent No. GB 2,100,795, the rotor comprising a body havng an inner profile providing part peripheral location portions in the regions of the mid points of the rotor sides which are engaged by an insert, the insert having a bearing part and an indexing gear of the rotor, the inner profile of the body adjacent to each apex of the rotor providing, with the insert, axially extending cooling passages.

In the rotor described in our previous patent, the insert is secured in position by drive pins and grub screws which extend parallel to the axis of rotation of the rotor which pins and screws are located between the insert and the inner profile of the body in passageways which are defined partly by the insert and partly by the inner profile of the rotor body.

Although such a securing means has proved satisfactory for motor cycle engines, problems have been encountered in engines which are run continuously at high powers, such as engines which may be used in boats and in aeroplanes.

It has been found that during prolonged overload testing, the axial screws and axial drive pins tend to work loose thus permitting the insert to move slightly axially and/or circumferentially relative to the rotor body.

Accordingly a new means of securing the insert to the body of the rotor has had to be found.

SUMMARY OF THE INVENTION

According to one aspect of the invention we provide a rotor for a rotary internal combustion engine of the kind specified comprising a body having an outer profile of generally equilateral triangular shape, and an inner profile providing part peripheral location portions in the regions of the mid points of the rotor sides, which portions, in use, are in engagement with an insert, the insert providing a bearing part and an indexing gear of the rotor, the inner profile of the body adjacent each apex extending outwardly of the insert over substantially the entire axial length of the body to provide axial cooling passages for the flow of air therethrough, securing means securing the insert to the rotor body, the securing means comprising at least one rigid elongate fastener which extends into a first passage part of the insert from a second passage part which extends through and opens to the outer periphery of the body of the rotor, the first and second passage parts and hence the fastener extending transverse to the axis of rotation of the rotor at an angle of between 70° and 90° to the axis.

The air which flows through the axial cooling passages may be contained in a charge, i.e. a mixture of air and fuel.

Preferably the fastener extends at an angle of about 90° to the axis.

It has been found that in such a construction, the insert can be permanently secured to the rotor body, and the fastener can be prevented from working loose even at continuous high engine loads and speeds.

The fastener preferably comprises a pin which may be a drive fit into the first and/or second passage parts, preferably both passage parts.

The first passage part may extend substantially entirely through the insert, or may be blind at the end of the first passage part in the insert nearest to the axis of rotation of the rotor.

It will be appreciated that in use, the outer profile of the rotor is subjected to high pressures as charge is compressed and ignited in the working chambers. Typically such a force can exceed 600 lbs. per square inch (42 kilogrammes per square centimeter).

Previously it has always been thought essential to retain the integrity of the outer profile of the rotor and this may be the reason why previously, passages have not been provided from the outer profile to receive pin fasteners which extend transversely to the axis of rotation of the rotor, to secure the insert to the rotor body. However, it has been found, surprisingly, that it is not difficult to seal the passageways at the outer profile of the rotor to prevent the charge, or the exhaust gases, escaping from any working chamber.

In one arrangement, the fastener has a head which is received in a receiving, counterbore or countersunk, formation of the second passage part adjacent to the outer periphery of the rotor body. The head of the fastener may be welded to the rotor body to form a seal, and then excess material removed so that the head of the fastener and any welding material, lies flush with the outer profile of the rotor body.

In an alternative arrangement, the fastener comprises a tapered pin which is driven through the second passage part and into the first passage part. To retain the pin, where the first passage part extends entirely through the insert, the inner periphery of the first passage part may be peened over. The outer end of the fastener adjacent the outer profile of the rotor may be retained by peening over the periphery of the second passage part at the outer profile.

Preferably a plurality of fasteners are provided to secure the insert to the rotor body, each fastener being received in its own first and second passage parts in the insert and rotor body respectively. One fastener only may be provided on each side of the triangular rotor.

It is anticipated that where more than one fastener is provided along any side, the fasteners may tend to react against one another which could cause loosening of the fasteners and/or damage to the rotor body.

In any case, preferably where a plurality of fasteners are provided, these are arranged in corresponding positions along the sides of the rotor body, so as to retain the balance of the rotor.

Conveniently, the rotor body is cast, for example in SG iron. The insert is conveniently made as a turned steel casting or forging. The or each fastener is preferably solid and made from steel although where the rotor and insert are made of other materials, the or each fastener may be made from other materials also. Preferably, however, suitable materials are chosen to reduce to a minimum any differential expansion effect between the rotor body, insert and fastener or fasteners.

Conveniently, the indexing gear of the insert is provided at one end of the rotor along the rotational axis, and the bearing part towards an opposite end. Conveniently the or each fastener is spaced axially along the rotor away from the gear, in a circumferential position where the rotor body wall is at or is approaching its thickest part.

The axial cooling passages for the flow of air or charge therethrough are preferably bounded by the rotor body and the insert.

BRIEF DESCRIPTION OF THE DRAWINGS

The invention will now be described with the aid of the accompanying drawings in which.

DESCRIPTION OF THE PREFERRED EMBODIMENT

A rotary engine of the so-called Wankel type is described in detail in our previous specification GB No. 2,100,795 and hence detailed description of an engine with which a rotor in accordance with the present invention may be used is not considered to be required. Suffice it to say that a typical Wankel engine has a stationary housing which has a two-lobed epitrochoidal bore therethrough which provides a cavity and end plates to close the cavity at each end thereof.

Figure 1:
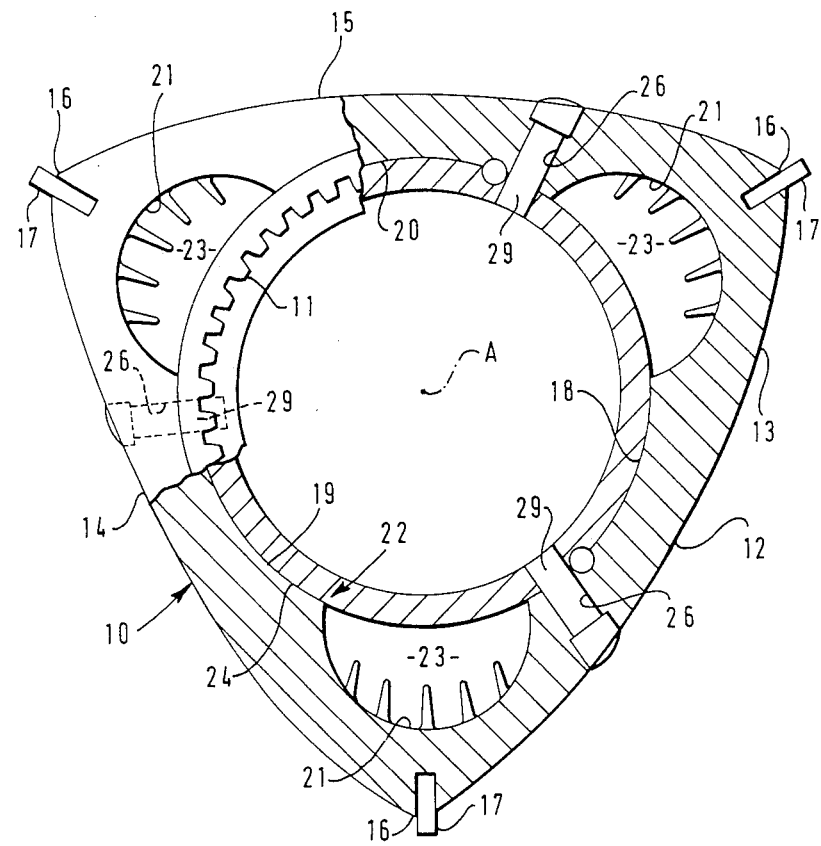
FIG. 1 shows a fragmentary cross-section of a rotor in accordance with the invention taken along a line generally perpendicular to the axis of rotation of the rotor.

A rotor 10 (described below) is rotatably mounted by a needle bearing upon an eccentric journal of a main shaft which is rotatably mounted in bearings mounted in the end plates so that the rotor rotates in a planetary manner within the cavity. The rotor has an internally toothed indexing gear (shown at 11 in FIGS. 1 and 2) which meshes with an externally toothed fixed gear carried by one of the end plates of the engine, and the gear 11 controls the planetary motion of the rotor 10, the teeth ratios beng such that the rotor 10 rotates once for every three revolutions of the main shaft.

As the rotor 10 rotates in the housing, working chambers are formed between an outer profile 12 of the rotor and the walls of the cavity, which working chambers vary in volume as the rotor rotates, inlet and exhaust ports being provided to enable a charge to be introduced, and exhausted after ignition. The charge may be ignited by a spark plug or other spark ignition means, or by heat caused by compression of the gaseous charge.

Referring now to the drawings, the rotor 10 comprises a body having an outer profile 12 of generally equilateral triangular shape with three outwardly curved sides 13, 14, 15 which meet at apices 16 at which sealing strips 17 are provided, which strips 17 form a seal with the wall of the engine cavity in which the rotor rotates.

Figure 2:
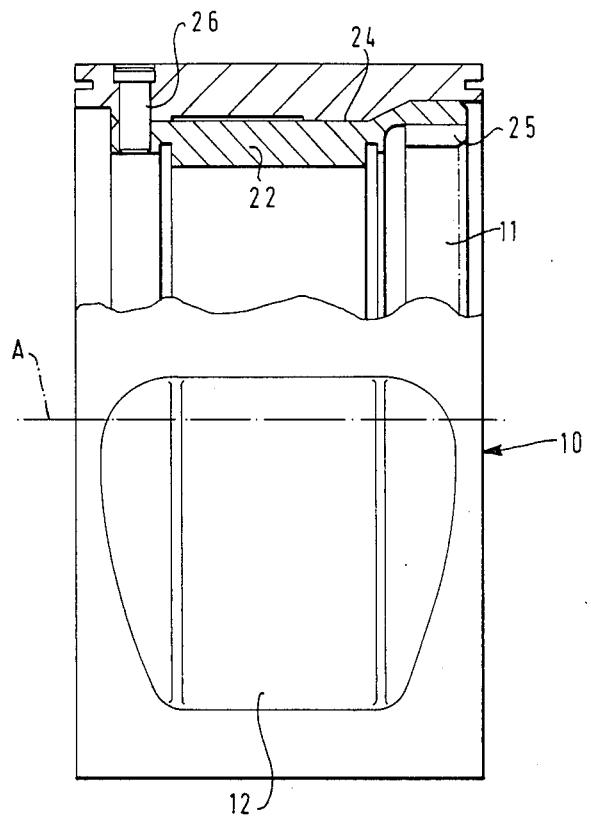
FIG. 2 is a side view partly in section of the rotor of FIG. 1 again partly in section.

The rotor body also has an inner profile which provides part-circular location portions 18, 19, 20 which are of different diameters at different positions axially of the rotor as shown in FIG. 2, where the stepped nature of the location portions 18, 19, 20 is best illustrated.

Adjacent each apex 16 there is gap between the location portions 18, 19, 20 since the inner profile of the rotor 10 in this region provides a part-cylindrical wall 21 to provide a recess in the rotor 10. Accordingly when an insert 22 is engaged with the location portions 18, 19, 20 passageways 23 are formed between the wall part 21 and the external surface 24 of the insert 22 at the apices 16 through which cooling air and charge may pass.

The external surface 24 of the insert 22 is an interference fit with the location portions 18, 19, 20.

The internal surface of the insert 22 is machined in the region indicated at 25 to provide an indexing gear 11 at one end axially of the rotor. In order to prevent rotation of the insert 22 relative to the rotor body, and axial movement of the insert relative to the rotor body, radially extending passageways 26 are provided, one only along each rotor side, each passageway 26 receiving a rigid elongate fastener comprising a pin 29. Each passageway 26 comprises a first passage part 27 provided in the insert 22, and a second passage part 28 provided in the rotor body. The pin 29 is a drive fit with each of the passage parts 27, 28.

Figure 3:
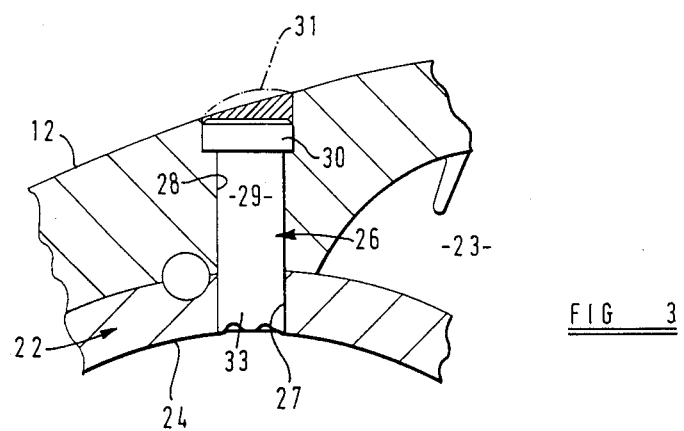
FIG. 3 is an enlarged fragmentary section of part of the rotor of FIGS. 1 and 2.

It can be seen from FIG. 3 that each pin 29 has a head 30 which is received in a counterbore 31 of the second passage part 28 adjacent to the outer profile 12 of the rotor 10. The head 30 of the pin 29 is welded to the rotor body to provide a substantially gas tight seal. Excess material of the head 30 and welding material (shown in dotted lines at 31) is subsequently removed so that the remainder of the head 30 and welding material lies flush with the outer profile 12 of the rotor 10.

If desired instead of a counterbore 31, any other countersunk formation may be provided if required.

It can be seen that the second passage part 28 extends entirely through the rotor body and that the first passage part 27 also extends entirely through the insert 22. The pin 29 is however prevented from passing into the interior of the rotor 10 by the head 30. To prevent the pin 29 moving outwardly, the inner end 33 of the pin 29 which lies adjacent the inner surface of the insert 22 is peened over.

The three passageways 26 are equally spaced around the rotor body so as to maintain the balance of the rotor, although other arrangements and compensating balance means may be provided if required.

The rotor body is made as a one-piece casting in spheroidal graphite (SG) iron, whilst the insert 22 is conveniently made as a forging in an appropriate bearing steel, or from a bar of bearing steel. The pins 29 are preferably made in high grade stainless steel and thus differential expansion between the rotor body, insert 22 and drive pins 29 is minimised. It will of course be appreciated that other suitable combinations of materials may be used if required.

In the example described, the insert 22 comprises a one-piece construction, but if desired the insert 22 may be sectional. Where the insert 22 is sectional, two or more sections of the insert may engage any location portion 18, 19, 20. The rotor body of the rotor 10 may be designed to withstand the thermal and mechanical stresses imposed thereon without any consideration as to the strength of the insert 22. However, if required, in designing the rotor, the strength of the rotor body and insert 22 together may be arranged to withstand the various stresses. In each case, the insert 22 needs to be adequately strong to withstand the forces imposed thereon during operation of the engine.

Although the invention has been described in relation to a Wankel type engine, it will be appreciated that a rotor in accordance with the invention may be used in other types of rotary engine if required, although some modifications may be required.

As described, the fasteners which secure the insert 22 to the rotor body are pins 29. Alternatively, any other type of solid or hollow rigid fastener may be provided although is has been found that drive pins are preferred compared to threaded fasteners as threaded fasteners can tend to work loose.

The pins 29 need not be headed as described although again this is preferred, and need not have peened over opposite ends. Any other means of preventing longitudinal movement of the pins 29 or other fasteners may be employed as required.

Although, as described, both of the passage parts 27 and 28 extend entirely through the insert and rotor body respectively, if desired the first one of the passage parts may extend only partway through the insert. It is however preferred that both passage parts extend entirely through the respective insert and rotor body for convenience of manufacture.

As described, the passageways 26 and hence the fasteners 29 received in the passageways 26, are arranged at substantially 90° to the rotational axis A of the rotor. If desired, the passageways 26 and hence fasteners 29 could extend at other angles, although preferably fasteners do not extend at an angle less than 70° to the axis of rotation of the rotor.

Figure 4:
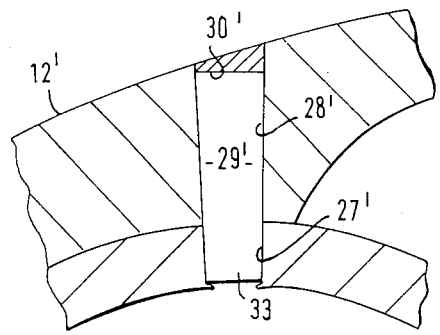
FIG. 4 is an enlarged view similar to FIG. 3 but of a modified construction in accordance with the invention.

Referring to FIG. 4, an alternative construction is shown. Like parts to the construction of FIG. 3 are shown with the same reference numerals, but with a prime sign added.

The constructions of FIGS. 3 and 4 are very similar but instead of using headed pins 29, the construction of FIG. 4 uses rigid tapered pins 29'.

Thus the second passage part 28 is not stepped to accommodate any head 30 of the pin 29, but rather, the first and second passage parts 27' 28' are tapered, at a similar degree of taper to the pin 29'.

In the present example, the pin 29' and the passage parts 27', 28', taper at an angle of between 1° and 2° although other angles of taper are no doubt possible.

The end 30' of the pin 29' nearest the outer periphery 17' of the rotor body is welded as described with reference to the head 30 of pin 29 in FIG. 3, and the opposite end 33' of the pin is retained because the innermost periphery of the first passage part 27' is peened over.

Conveniently, in both embodiments described, the second passage parts 28, 28' which open to the outer profile of the rotor body and are formed by machining from the outside. Further, the pins or other elongate, axially and radially rigid fasteners are inserted from the outside for convenience of assembly.

I claim:

1. A rotor for a rotary internal combustion engine of the kind in which a rotor rotates within a cavity in a housing, the rotor and walls of the cavity being shaped so that working chambers are formed therebetween which vary in volume as the rotor rotates, the cavity being provided with inlet and outlet ports for fuel and air, the rotor comprising a body having an outer profile of generally equilateral triangular shape, and an inner profile providing part peripheral location portions in the regions of the mid points of the rotor sides, which portions, in use, are in engagement with an insert, the insert providing at least one of a bearing part and an indexing gear of the rotor, the inner profile of the body adjacent each apex extending outwardly of the insert over substantially the entire axial length of the body to provide axial cooling passages for the flow of air therethrough, securing means securing the insert to the rotor body, the securing means comprising at least one rigid elongate fastener which extends into a first passage part of the insert from a second passage part which extends through and opens to the outer periphery of the body of the rotor, the first and second passage parts, and hence the fastener, extending transverse to the axis of rotation of the rotor at an angle of between 70° to 90° to the axis.

2. A rotor according to claim 1 wherein the fastener extends at an angle of about 90° to the axis.

3. A rotor according to claim 1 wherein the fastener comprises a pin which is a drive fit into at least one of the first and second passage parts.

4. A rotor according to claim 1 wherein the first passage part extends substantially entirely through the insert.

5. A rotor according to claim 1 wherein the fastener has a head which is received in a receiving formation of the second passage part adjacent to the outer periphery of the rotor body, the head of the fastener being welded to the rotor body to form a seal, and excess material subsequently removed so that the head of the fastener and any welding material, lies flush with the outer profile of the rotor body.

6. A rotor according to claim 4 wherein to retain the fastener, the inner periphery of the first passage part is peened over.

7. A rotor according to claim 1 wherein one fastener only is provided on each side of the triangular rotor, each fastener being received in its own first and second passage parts in the insert and rotor body respectively, in corresponding positions along the sides of the rotor body, so as to retain the balance of the rotor.

8. A rotor according to claim 1 wherein the rotor body is made by casting.

9. A rotor according to claim 1 wherein the insert is made as a turned steel casting or forging.

10. A rotor according to claim 1 wherein the or each fastener is solid.

11. A rotor according to claim 1 wherein the indexing gear of the insert is provided at one end of the rotor along the rotational axis, and the bearing part is towards an opposite end.

12. A rotor according to claim 11 wherein the thickness of the rotor body wall is at a minimum at the midpoint sides and increases towards the apices, the or each fastener is spaced axially along the rotor away from the gear, in a circumferential position between a midpoint and the apices adjacent a cooling passage where the rotor body wall is at or is approaching its thickest part.

* * * * *